(12) United States Patent
Hutchings et al.

(10) Patent No.: US 11,834,067 B1
(45) Date of Patent: Dec. 5, 2023

(54) COMFORT SCALES FOR AUTONOMOUS DRIVING

(71) Applicant: Waymo LLC, Mountain View, CA (US)

(72) Inventors: Keith Hutchings, San Francisco, CA (US); Ilmo Konstantin van der Löwe, Fremont, CA (US); Taylor Boyce Bixby, Berkeley, CA (US)

(73) Assignee: Waymo LLC, Mountain View, CA (US)

( * ) Notice: Subject to any disclaimer, the term of this patent is extended or adjusted under 35 U.S.C. 154(b) by 194 days.

(21) Appl. No.: 17/390,261

(22) Filed: Jul. 30, 2021

(51) Int. Cl.
*B60W 60/00* (2020.01)
*G08G 1/01* (2006.01)
*G06V 20/56* (2022.01)
*G06F 18/214* (2023.01)

(52) U.S. Cl.
CPC ......... *B60W 60/001* (2020.02); *G06F 18/214* (2023.01); *G06V 20/56* (2022.01); *G08G 1/0125* (2013.01); *B60W 2554/4049* (2020.02)

(58) Field of Classification Search
CPC ......... B60W 60/001; B60W 2554/4049; G06F 18/214; G06V 20/56; G08G 1/0125
See application file for complete search history.

(56) References Cited

U.S. PATENT DOCUMENTS

| | | | |
|---|---|---|---|
| 9,483,948 B1 * | 11/2016 | Gordon | B60W 30/00 |
| 10,496,091 B1 * | 12/2019 | Ross | G06N 7/01 |
| 10,915,762 B1 * | 2/2021 | Russell | G06V 20/58 |
| 11,021,148 B2 * | 6/2021 | Ghafarianzadeh | B60W 30/0956 |
| 11,061,398 B2 * | 7/2021 | Levinson | G01S 7/4972 |
| 11,572,083 B2 * | 2/2023 | Maat | B60W 40/09 |
| 2020/0283016 A1 * | 9/2020 | Blaiotta | B60W 60/0011 |
| 2021/0114627 A1 * | 4/2021 | McCurrie | G06V 20/584 |
| 2021/0182604 A1 * | 6/2021 | Anthony | B60W 30/00 |

(Continued)

OTHER PUBLICATIONS

Rasouli, A et al. Autonomous Vehicles That Interact With Pedestrians: A Survey of Theory and Practice, IEEE Transactions of Intelligent Transporation Systems, vol. 1, No. 3, Mar. 2020, pp. 900-918 [online], [retrieved on Mar. 31, 2023]. Retrived at <https://ieeexplore.ieee.org/abstract/document/8667866> (Year: 2020).*

(Continued)

*Primary Examiner* — Peter D Nolan
*Assistant Examiner* — Peter Y Ning
(74) *Attorney, Agent, or Firm* — Fish & Richardson P.C.

(57) ABSTRACT

Methods, systems, and apparatus, including computer programs encoded on computer storage media, for using comfort scales to assess the performance of autonomous vehicles. One of the methods includes receiving data representing a traffic encounter between a vehicle and a pedestrian. A plurality of comfort scale ratings of the encounter assigned by a rater belonging to a first rater pool are received. An input element is generated for a rating transformation model configured to predict how comfort scale ratings assigned by a particular rater pool would have been assigned by a representative rater belonging to a reference rater pool. An inference pass is performed over the rating transformation model using the input element to obtain a plurality of transformed comfort scale ratings for the reference rater pool.

20 Claims, 4 Drawing Sheets

(56) References Cited

U.S. PATENT DOCUMENTS

2021/0390291 A1* 12/2021 Sameer ............... G06V 40/103
2022/0139070 A1*  5/2022 Okamoto ............. G06N 3/045
                                                        382/159
2022/0188667 A1*  6/2022 Burisch ................ G08G 1/166
2022/0332350 A1* 10/2022 Jha ..................... H04W 4/024

OTHER PUBLICATIONS

Chen, T et al. PSI: A Pedestrian Behavior Dataset for Socially Intelligent Autonomous Car, arxiv.org [online], [retrieved on Mar. 31, 2023]. Retrieved from the Internet <https://arxiv.org/pdf/2112.02604> (Year: 2022).*

Liu, H et al. Importance of Instruction for Pedestrian-Automated Driving Vehicle Interaction with an External Human Machine Interface:, 2021 IEEE Intelligent Vehicle Symposium, Jul. 11-17 [online], [retrieved Mar. 31, 2023]. Retrieved from Internet <https://ieeexplore.ieee.org/abstract/document/9575246> (Year: 2021).*

* cited by examiner

COMFORT SCALES FOR AUTONOMOUS DRIVING

BACKGROUND

This specification relates to autonomous vehicles and techniques for automatically assessing driving behaviors of autonomous vehicles.

Autonomous vehicles include self-driving cars (including buses, trucks etc.), boats, and aircraft. Autonomous vehicles use a variety of on-board sensors and computer systems to detect nearby objects and use such detections to make control and navigation decisions.

Fully autonomous driving by an autonomously driven vehicle (ADV) has been a difficult and complex technical problem. Part of the complexity stems from the fact that simply knowing current traffic laws, reliably detecting other vehicles and pedestrians, and being able to control the vehicle to high degrees of precision are still often not enough to achieve fully autonomous driving.

This is because traffic often moves according to unwritten rules, particularly when interacting with pedestrians and other road users. For example, if a pedestrian is waiting for traffic to pass before crossing a road, it would be unusual and could be highly disruptive to the flow of traffic if an ADV were to stop suddenly for the pedestrian to pass. Conversely, if a pedestrian makes a hand signal that she wants to cross the road, unwritten rules of local traffic flow might dictate that vehicles should heed the hand signal. And it could be highly concerning to the pedestrian if an ADV sped past instead of heeding the hand signal, even if doing so is perfectly legal according to local traffic rules.

Moreover, simple metrics like speed and proximity to pedestrians have proven to be inadequate and disruptive to traffic when making fully autonomous driving decisions around pedestrians and other road users. In particular, it is extremely inefficient for an ADV to simply stop or slow down any time a pedestrian gets within a threshold distance of the vehicle. In fact, there are many situations where vehicles driving quickly in close proximity to pedestrians is perfectly acceptable, such as when pedestrians stand at the edge of a road waiting for a walk signal to cross a busy street. As another example, making a turn in areas with heavy foot traffic often requires a vehicle to approach openings in pedestrians crossing the road.

Further complicating the technical challenges is that the standards for expected driving behaviors are highly localized. In other words, the expectations around driving norms in Denver are very different from those in Sao Paolo.

SUMMARY

This specification describes how a system can automatically and reliably generate comfort scales that represent the subjective effects experienced by other road users due to the driving actions of an ADV. The system described below solves the aforementioned problems by exploiting the fact that subjective experiences can be effectively and accurately modeled from ratings assigned to traffic encounters represented in trip log data. In addition, the techniques described below solve the problems relating to highly localized traffic norms in a scalable way.

Particular embodiments of the subject matter described in this specification can be implemented so as to realize one or more of the following advantages. The techniques described in this specification allow a system to automatically and systematically model the subjective experiences of other road users, which is data that is often not observable. This allows for training driving control models that effectively take human subjective experiences into account when planning, which results in ADVs that drive in less surprising and more courteous ways. By training driving control modules to be able to identify the conditions in which the expectations (norms) and comfort of driving maneuvers vary, driving can be performed more appropriately and fluidly. This allow a system to fine-tune an ADV for the unwritten driving norms in any geographic locality. These techniques also allow the system to train an ADV for temporal locality of unwritten norms, e.g., to account for the differences in unwritten driving norms during a workday at rush hour, where it might be more appropriate to slowly turn in close proximity to pedestrians in a crosswalk, versus a Sunday afternoon where such driving behavior would not be considered appropriate according to unwritten driving norms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
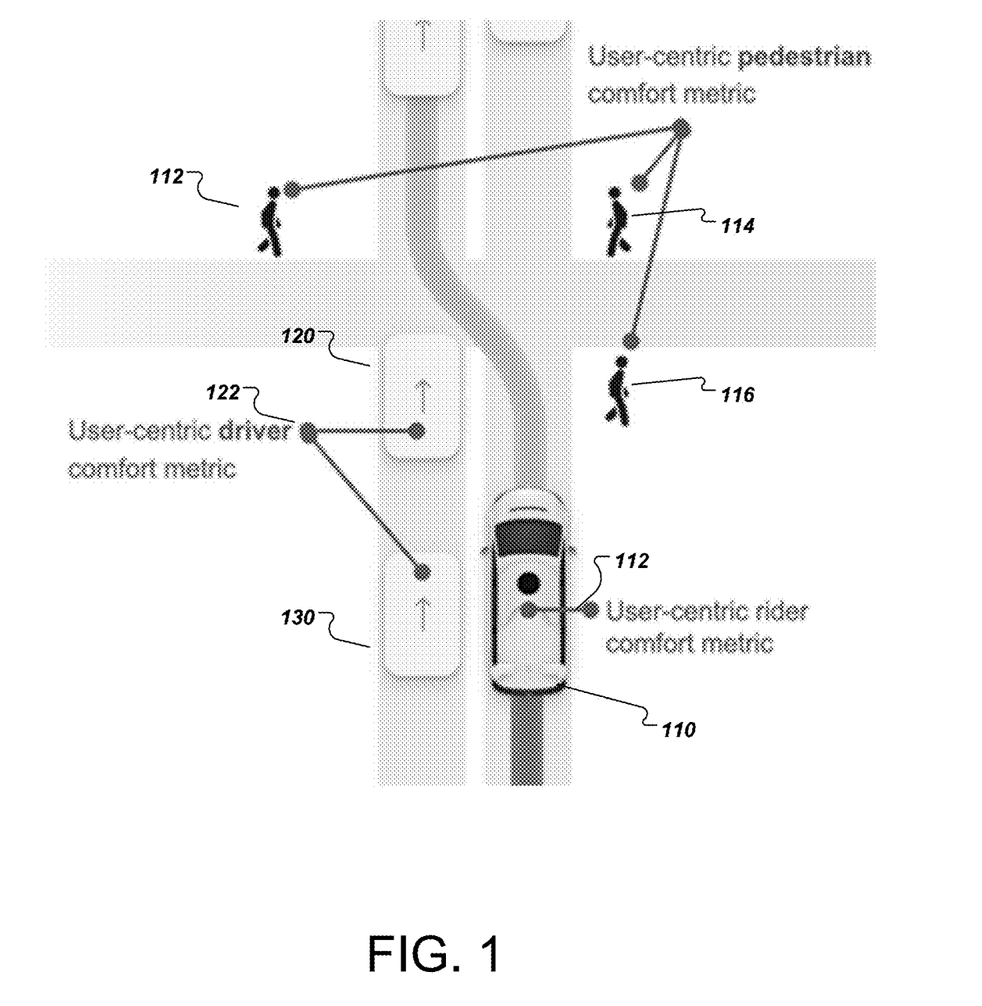
FIG. 1 is a diagram that generally illustrates other road users whose experiences can be modeled using comfort scales.

FIG. 1 is a diagram that generally illustrates other road users (ORUs) whose subjective experiences of traffic encounters with an ADV can be modeled for the purposes of enhancing the performance of ADVs. In this example traffic encounter, an ADV 110 changes lanes in front of another vehicle 120 in the presence of several pedestrians 112, 114, and 116 and another vehicle 130.

The ORUs who could be subjectively affected by this maneuver can include the pedestrians 112, 114, and 116; drivers and riders of other vehicles 120 and 130; as well as riders within the ADV itself. The comfort, or lack thereof, of all of these entities can be highly relevant to evaluating the control system or performance of the ADV.

To assess that performance, a system can use one or more different attributes that characterize the subjective experience of a traffic encounter, attributes that in this specification will be referred to as comfort scales. Each comfort scale defines a range of values for a particular attribute that can be rated by a third-party rater. In general, using multiple different comfort scales allows the system to more accurately encompass the entire spectrum of subjective experiences that are relevant to evaluating the performance of an ADV.

In other words, each traffic encounter can be evaluated by a human rater who assigns values to each of the comfort scales. For example, a human rater can view a video recreation of a real or simulated traffic encounter. The rater can then assign values to each of the comfort scales for the traffic encounter.

A first example of a comfort scale is surprise. Surprise has a high value when an ORU would be startled or shocked by the ADV during the traffic encounter. Surprise has a low value when an ORU would not be shocked or startled by the actions of the ADV during the traffic encounter. Thus, for example, a rater can assign a surprise value for a traffic encounter by selecting a value on a scale having endpoints representing the encounter being entirely predictable and being entirely surprising.

Another example of a comfort scale is civility. Civility can represent a value between an ADV being extremely courteous and extremely rude. The civility comfort scale can capture additional subjective experiences of ORUs over and above surprise. For example, during a traffic encounter a pedestrian might shake his or her head with displeasure at the actions of an ADV, but without exhibiting any sense of being surprised by it. Thus, for example, a rater can assign a civility value for a traffic encounter by selecting a value on a scale having endpoints representing the encounter being very courteous and being very rude.

Another example of a comfort scale is intensity. Intensity can represent how closely ORUs would be energized or activated by the actions of the ADV. ORUs who would remain calm and unaroused in the presence of the ADV would have low intensity, while ORUs who would be aroused or energized by the ADV would have high intensity. Thus, for example, a rater can assign an intensity value for a traffic encounter by selecting a value on a scale having endpoints representing the encounter being very passive/calm to being very active/intense.

Another example of a comfort scale is valence. Valence can represent the pleasantness of a traffic encounter. For example, a pedestrian can visibly show or express irritation or frustration by the actions of an ADV, e.g., by throwing their hands in the air. Such an action might register low on the valence comfort scale, meaning a very negative or unpleasant experience. In other words, a traffic encounter can be viewed as unpleasant even if it is not surprising, reasonably civil, and low in intensity. Thus, for example, a rater can assign a valence value for a traffic encounter by selecting a value on a scale having endpoints representing the encounter being pleasant and being unpleasant.

Using a combination of these comfort scales can allow the system to adequately capture the full range of subjective experiences that are relevant to building state-of-the art ADV control systems. In other words, a system can use these comfort scales to build an ADV that acts in unsurprising ways, acts civilly, and doesn't make people nervous or feel unpleasant. And again, it is virtually impossible to achieve these goals by building an ADV that merely obeys traffic laws without recognizing social norms in traffic.

A major advantage of the system being able to systematically model comfort scales using human ratings is that human raters can empathetically experience the comfort scales by watching the recreation. This is powerful because a pedestrian might show only subtle social signals or even zero observable reaction to a dangerous traffic encounter. But human raters imagining themselves in the situation of the pedestrian can nevertheless provide powerful insight into assessing the actions of the ADV during the traffic encounter because of their familiarity with such traffic encounters.

The power of using empathetic experience ratings also provides vast opportunities for using simulated data. In particular, the system may, but need not, figure out how to simulate the reactions of pedestrians in all kinds of rare traffic encounters. Rather, the human raters can empathetically place themselves in that situation to reveal how it might affect other road users.

Figure 2:
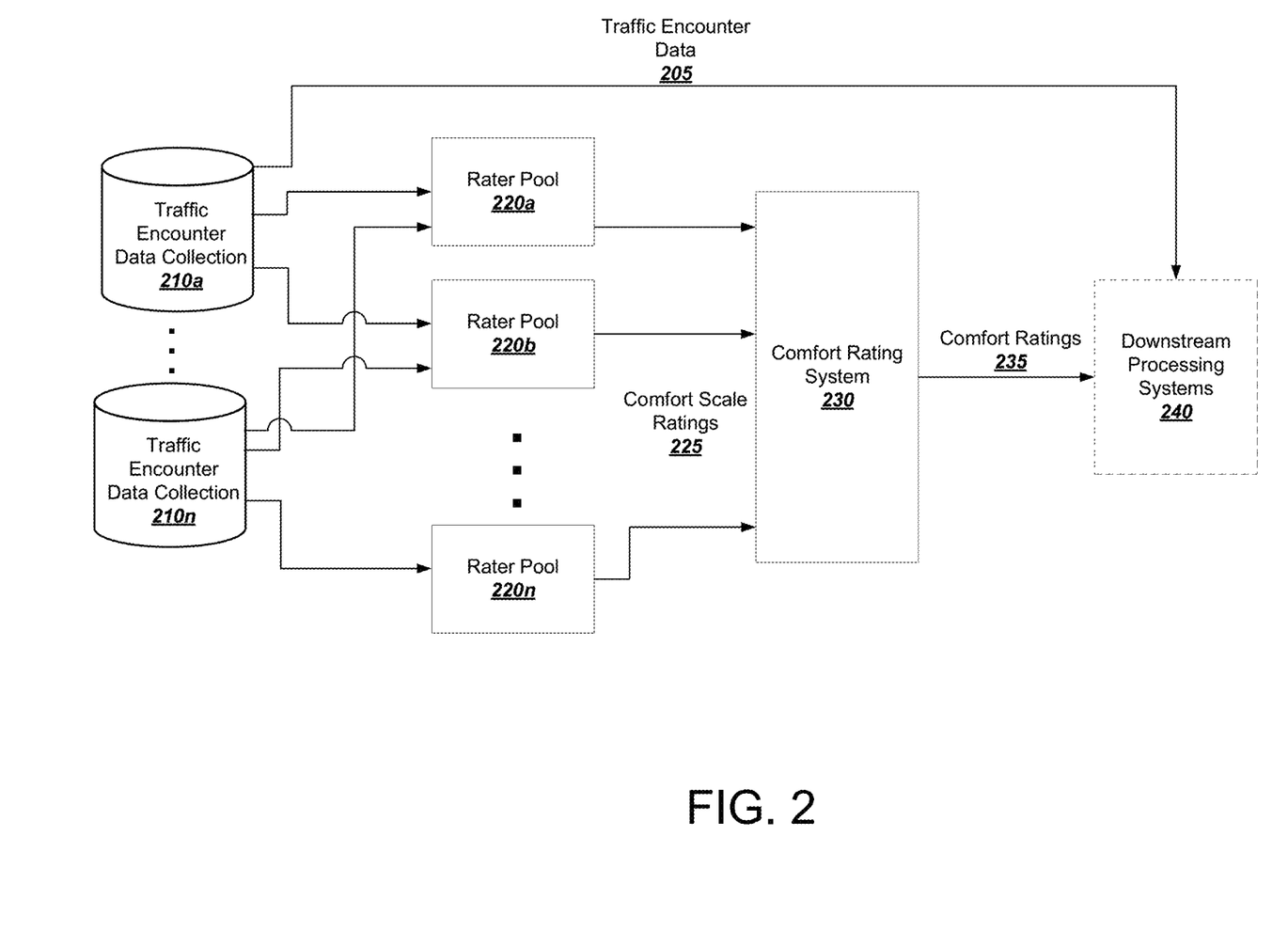
FIG. 2 is a diagram of how multiple rater pools can be used to generate comfort ratings for traffic encounters.

FIG. 2 is a diagram of how multiple rater pools can be used to generate comfort ratings for traffic encounters. In general a system can use multiple rater pools 220a, 220b, through 220n to obtain ratings for traffic encounters. The traffic encounters can be represented in collections of traffic encounter data 210a-n. For example, each traffic encounter can be represented by a real or simulated video of an interaction between an ADV and an ORU.

Each rater pool 220a-n can include human raters who have in common familiarity with traffic norms in a particular geographic region. For example, the rater pool 220a can include human raters living in San Francisco, while the rater pool 220b can include human raters living in India.

The system can designate one of the rater pools as a reference rater pool. The reference rater pool is the pool whose ratings the system wants to model for generating the comfort ratings. In other words, the system can train a machine learning model that will transform comfort scale ratings assigned by any of the rater pools to be comfort scale ratings as if they were assigned by someone in the reference rater pool.

The system can select a rater pool to be the reference rater pool based on geography. In other words, the system can select a rater pool to be the reference rater pool because that rater pool includes raters who have familiarity with the traffic norms in a particular target geographic area. For example, if the system is evaluating the performance of an ADV for the New York City metro region, the system can select a rater pool that includes raters with familiarity with the traffic norms in that region, e.g., because they live in the region.

Alternatively or in addition, the system can select a rater pool based on expertise. In other words, the system can select a rater pool to be the reference rater pool because the raters have been designated to be expert raters. For example, an entity that implements the evaluation system can designate a particular team of raters as being experts due to their familiarity with the comfort scales and the overall workings of the evaluation system. Even when the reference rater pool is selected because of expert users, the system can still adjust for local traffic norms during later stages of the processing pipeline. This is described in more detail below with reference to FIG. 4.

The transformation of comfort scale ratings from one rater pool to being ratings from the reference rater pool allows the system to account for three primary sources of variance that tend to arise in the rater pools. A first source of variance is the rater pool itself, which can be represented as a pool id. As mentioned above, raters belonging to different geographic regions will have different opinions about a traffic encounter. Thus, a traffic encounter rated as highly surprising by a rater in Iowa might not seem surprising at all to a rater in New York City.

A second source of variance is each rater themselves, which can be represented as a rater id. Rater variance reflects the fact that the same situation can be viewed very differently by two different people, even if they are located in the same pool location.

Another source of variance is each traffic encounter itself, which can be represented using a log id, where the log id identifies a log having the data representing the traffic encounter. Encounter variance reflects the fact that some traffic encounters will seem more severe or more ambiguous than others, which can be taken into account when generating the comfort ratings.

As illustrated in FIG. 2, not all rater pools need to generate comfort scale ratings for all traffic encounters. Rather, all that is required for a rater pool to be used in generating the final comfort ratings is commonality of video id with the reference rater pool. In other words, only the reference rater pool needs to assign comfort scale ratings for all the traffic encounters. Other rater pools can assign comfort scale ratings to a subset of all traffic encounters.

The computed comfort ratings 235 can be provided to one or more downstream processing systems 240. For example, a system that trains a planning machine learning model can use the comfort ratings 235 as a ground truth for assessing a particular plan. To do so, the planning system can receive the same traffic encounter data 205 that were used to generate the comfort scale ratings along with a computed comfort rating 235 of the encounter. In some implementations, candidate driving plans generated by the planning system are all the way through the pipeline, e.g., by adding the candidate driving plan and associated sensor data to the traffic encounter data collections 210-an.

The system can then use the resulting comfort ratings 235 in a cost function for training the planning system. This will cause the system to optimize the planning system to generate candidate driving plans that do not make ORUs feel uncomfortable. In other words, using the comfort ratings in the cost function in the long run results in a system that automatically generates driving plans that are unsurprising, courteous, calm, pleasant, or some combination of these. In doing so, the planning system effectively gets programmed with the empathetic experiences of human raters.

Figure 3:
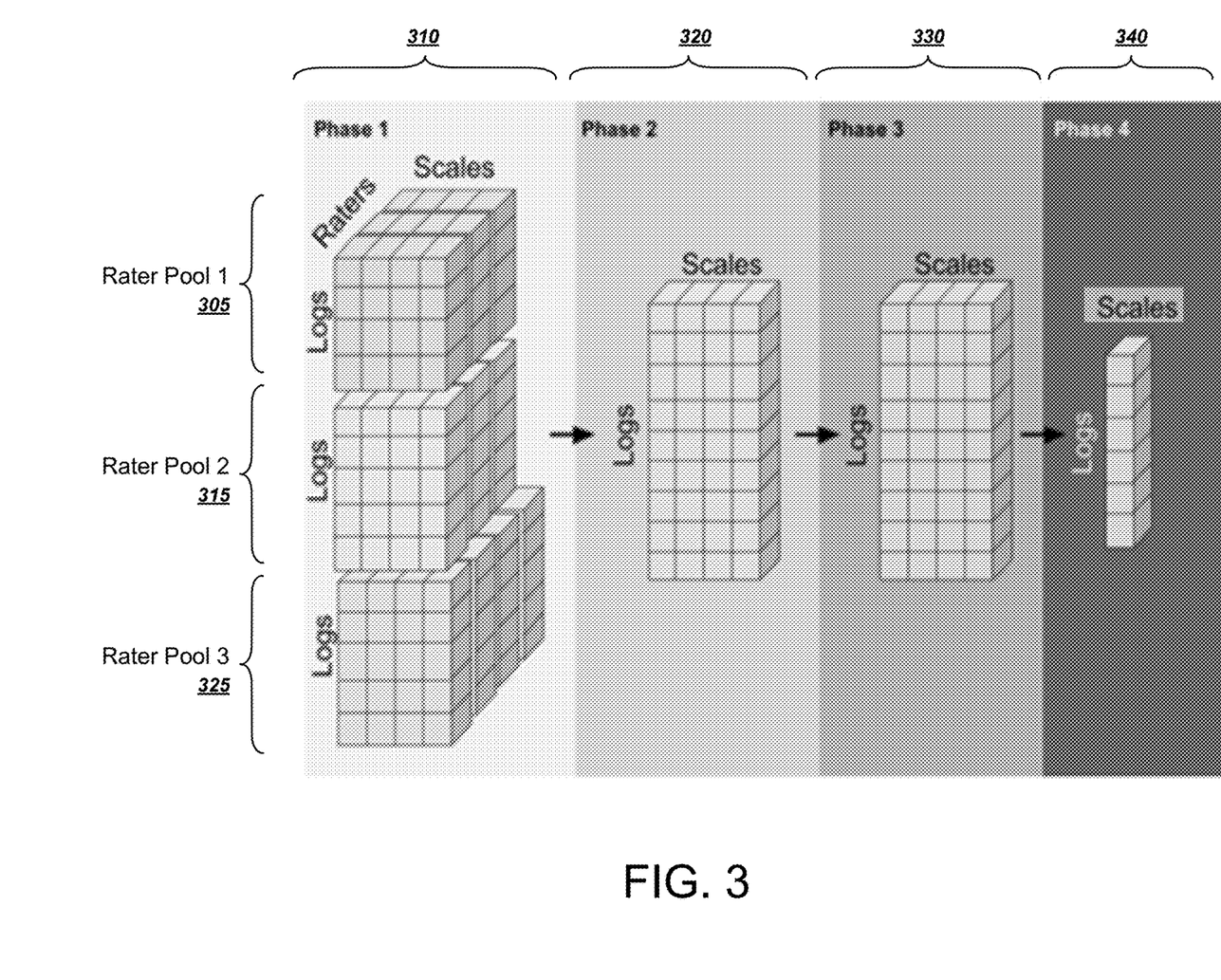
FIG. 3 graphically illustrates an example processing pipeline for transforming comfort scale ratings.

FIG. 3 graphically illustrates an example processing pipeline for transforming comfort scale ratings from multiple rater pools 305, 315, and 325 to comfort scores. The example pipeline has four phases, referred to as phase 1 310, phase 2 320 320, phase 3 330, and phase 4 340.

In phase 1, raters in multiple rater pools assign comfort scale values to logs, with each log representing a traffic encounter. As described above, each rater can view a recreation of a traffic encounter from data in a log, and then assign one or more comfort scale ratings.

In phase 1 310 of FIG. 3, the x axis represents the different comfort scales, the y axis represents the different logs, and the z axis represents different raters.

In this example, the reference rater pool is Rater Pool 3 325. This means that in phase 2, the system will use a trained model that transforms comfort scale ratings assigned by other rating pools to be ratings assigned by a representative rater of the reference rater pool. To do so, the system can train a machine learning model to account for the variances in different raters or rater pools. The model that transforms ratings from one rater pool to another will be referred to as a rating transformation model.

The input of phase 2 is thus the raw comfort scale ratings assigned by the rater pools, which are provided to the rating transformation model. The output of the rating transformation model in phase 2 is thus a plurality of comfort scale ratings assigned once to each of the logs.

The system can use any appropriate machine learning model to train the rating transformation model. In some implementations, the system uses a continuous-multioutput linear L2 regularized regression model or a hierarchical regression model to predict the comfort scale values.

The input features can include the rater id, the pool id, and the log id. These features can be represented as one-hot encodings to indicate which rater, which pool, and which log were used to generate the comfort scale values.

During training, the comfort scale values assigned by the reference rater pool can be used as a ground truth for ratings assigned by other rater pools. This allows the rating transformation model to learn how the different rater pools score the same logs relative to the reference rater pool.

After training, the system can perform a prediction for a set of comfort scale ratings while masking all information about the rater who assigned the comfort scale ratings. In some implementations, the system generates an extra out-of-sample rater feature that is always zeroed out during training but set to one during the prediction phase.

In addition, the system can set the pool id to that of the reference rater pool so that the model will transform the ratings from the rater's original pool id to be ratings as if they came from a representative rater from the reference rater pool.

Using the rating transformation model in this way is more powerful than using mere averaging techniques to consolidate ratings from multiple raters. In particular, using the rating transformation model takes advantage of learned information about each rater and each rater pool.

The output of Phase 2 is thus a set of comfort scale values for each scale for each log as if the log was rated by a representative rater from the reference rater pool.

Separate from the data transformation, validation analyses can reveal comfort characteristics for the target population used to form reference values. In Phase 3, the predicted comfort scale ratings are further transformed to account for differences between the reference rater pool and the local norms using a mapping from the reference rater pool to the local reference values. In some implementations, the system generates the validity function by computing linear transformation coefficients for each of the comfort scales and uses the coefficients to generate the output of phase 3 from the output of phase 2.

The system can optionally achieve additional validation by using first-person local ratings in Phase 3. In other words, the system can obtain comfort scale ratings assigned by local raters who actually interacted with an ADV in various driving situations. The system can then generate separate logs representing the first person interactions and obtain corresponding comfort scale ratings from the reference rater pool. This additional step provides further validation of using third-party observations to model the subjective experiences of ORUs. And in this example, it also provides further validation of local traffic norms as well as the subjective experiences.

Phase 4 is optional. In this phase the system can perform a dimensionality reduction process to generate a single comfort score for each log. In some contexts, the transformed comfort scale values can be highly correlated, so the transformation to single comfort score does not result in a significant loss of variance. For some use cases, the system further scales the comfort scores to fall within a predetermined range.

Figure 4:
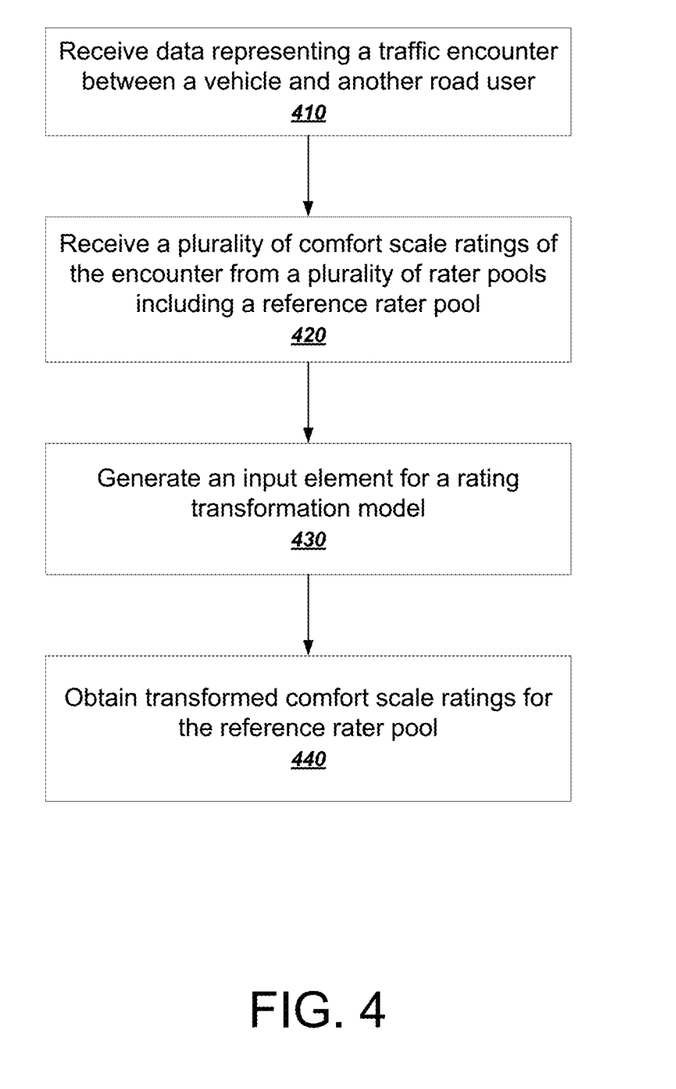
FIG. 4 is a flowchart of an example process for generating transformed comfort scale ratings.

FIG. 4 is a flowchart of an example process for generating transformed comfort scale ratings. The process can be performed by a computer system having one or more computers in one or more locations and programmed in accordance with this specification. The process will be described as being performed by a system of one or more computers.

The system receives data representing a traffic encounter between a vehicle and another road user (410). As described above, other road users can be pedestrians, drivers of other vehicles, or riders of the vehicle or other vehicles. Other road users can also include cyclists, construction workers, or any other appropriate person in close proximity to regions where ADVs travel.

The system can generate a log for each traffic encounter. The log can include multiple types of information about the encounter, including vehicle sensor data, camera images and video files recorded from other sources such as traffic cameras, location data, or any other appropriate data recorded for the traffic encounter.

As described above, the log data can be data recorded in the real world by a physical ADV. Alternatively or in addition, the log data can be simulated data. Using simulated data can greatly increase the amount of data that is available for training and can be used to test different variations of the same traffic encounter. For example, from one real traffic encounter, the system can generate many similar variations. As one example, a real traffic encounter might record that an ADV drove by a pedestrian waiting to cross a street with 2 feet of clearance and at 30 miles per hour. The system can then generate simulated log data that varies the clearance distance as well as the vehicle speed. This is a useful way for the system to acquire log data for very rare situations and without putting any actual humans in danger. The system can thus create an expanded training set having data from the real traffic encounters and data from the modified, simulated traffic encounters. The system can then train the model using the expanded training set.

The system receives a plurality of comfort scale ratings of the encounter from a plurality of rater pools including a reference rater pool (420). As described above, the system can use multiple rater pools in multiple different locations, and the reference rater pool can be selected based on rater characteristics. Rater characteristics can include geographical areas associated with the raters, expertise, or both.

The system generates an input element for a trained comfort scale transformation model (430). As described above, the trained rating transformation model can learn to adjust the ratings to account for variance in raters, rater pool locations, and logs.

During the inference pass of the rating transformation model, the system can change the rater id of a set of comfort scale values to be an out-of-sample id that was not used during training. And the system can set the rater pool id to be the reference rater pool.

The system obtains transformed comfort scale ratings for the reference rater pool (440). The transformed comfort scale ratings for the reference rater pool are a prediction by the model of how a representative user from the reference rater pool would have rated the same log.

As described above, the system can optionally perform a validity phase using a validity function, which can be based on first-person log data of pedestrians in the target geographic region. The system can also optionally perform a dimensionality reduction process to generate a single comfort score for each log.

The comfort scores can then be used to evaluate ADV performance or to train driving control models. In doing so, the resulting driving control models effectively take into consideration the subjective experiences of other road users, even though such subjective experiences are often not observable from onboard sensors.

A number of variations and extensions will now be described.

One variation is to record valence biometrically, using skin conductance, pupillary dilation, variation on heart rate or breathing rate, etc. While the method of data collection differs here, the underlying notion is the same: to use the cognitive and emotional empathy of an observer to approximate first person experience.

Other variations could include the method in which the log data is represented, which can include virtual reality and augmented reality, wherein the interaction would be overlaid onto a real road.

There are also many variations in how the raters can view the scene: fixed camera angle, specific points of view, multiple points of view, which could include top-down, for example. Scenes could also be altered or highlighted to draw the raters attention to specific aspects of the scene, which could improve the ability for raters to approximate first person experience.

The system can also alter other specific aspects of a to-be-rated interaction, including the size and type of vehicle within the interaction. For example, it is likely the comfort is much lower with a large truck compared to a small sub-compact vehicle, even if the speed, proximity and trajectory are identical.

In addition to altering the physical features of the ADV, the system can change context elements, e.g., scene location, inject new agents into the scene and/or overlay additional context information, e.g., arrows, highlight regions, messages and other graphical queues. Beyond visual sensory information the system can also include auditory signals to increase realism and/or to explore the effects of multimodal input on the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
- receiving data representing a traffic encounter between a vehicle and a pedestrian;
- receiving a plurality of comfort scale ratings of the encounter assigned by a rater belonging to a first rater pool;
- generating an input element for a rating transformation model configured to predict how comfort scale ratings assigned by a particular rater pool would have been assigned by a representative rater belonging to a reference rater pool; and
performing an inference pass over the rating transformation model using the input element to obtain a plurality of transformed comfort scale ratings for the reference rater pool.

Embodiment 2 is the method of embodiment 1, wherein the rating transformation model learns to adjust for variance in the comfort scale ratings attributable to rater pool location, rater id, and log id.

Embodiment 3 is the method of any one of embodiments 1-2, further comprising:
training the rating transformation model in a training phase in which each input element comprises a rater id; and
performing the inference pass in which the input element has a rater id that was not represented in the training data.

Embodiment 4 the method of embodiment 3, wherein during the training phase the input element comprises a pool id that identifies the first rater pool, and wherein performing the inference pass comprises changing the pool id to identify the reference rater pool.

Embodiment 5 is the method of any one of embodiments 1-4, wherein the data representing the traffic encounter between the vehicle and the pedestrian is data recorded by a physical ADV in a real-world driving environment.

Embodiment 6 is the method of any one of embodiments 1-5, wherein the data representing the traffic encounter between the vehicle and the pedestrian is simulated data generated for a simulated ADV in a simulated driving environment.

Embodiment 7 is the method of embodiment 6, further comprising:
receiving data representing a first traffic encounter between a physical ADV in a real-world driving environment;
applying one or more transformations to the data representing the first traffic encounter to create a modified set of simulated traffic encounters;
creating an expanded training set comprising the data representing the first traffic encounter and the modified set of simulated traffic encounters; and
training the rating transformation model using the expanded training set.

Embodiment 8 is the method of any one of embodiments 1-7, further comprising:
adjusting the transformed comfort scale ratings using a validity function learned for a target geographic region.

Embodiment 9 is the method of embodiment 8, wherein the validity function is based on first-person log data of pedestrians in the target geographic region.

Embodiment 10 is the method of any one of embodiments 1-9, further comprising performing a dimensionality reduction process to transform the plurality of comfort scale ratings into a single comfort score per log.

Embodiment 11 is the method of embodiment 10, further comprising:
using the comfort score in a cost function for training a driving model to avoid driving behaviors that make other road users uncomfortable due to being surprised, a lack of civility, or unpleasantness.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving data representing a traffic encounter between a vehicle and a pedestrian;
receiving a plurality of comfort scale ratings of the traffic encounter assigned by a rater belonging to a first rater pool;
generating an input element for a rating transformation model configured to predict how comfort scale ratings assigned by a particular rater pool would have been assigned by a representative rater belonging to a reference rater pool;
performing an inference pass over the rating transformation model using the input element to obtain a plurality of transformed comfort scale ratings for the reference rater pool;
training a driving control model using the transformed comfort scale ratings; and
controlling an autonomously driven vehicle (ADV) based on the driving control model trained on the plurality of transformed comfort scale ratings for the reference rater pool.

2. The method of claim 1, wherein the rating transformation model learns to adjust for variance in the comfort scale ratings attributable to rater pool location, rater id, and log id.

3. The method of claim 1, further comprising:
training, using training data, the rating transformation model in a training phase in which each input element comprises a rater id; and
performing the inference pass in which the input element has a rater id that was not represented in the training data.

4. The method of claim 3, wherein during the training phase the input element comprises a pool id that identifies the first rater pool, and wherein performing the inference pass comprises changing the pool id to identify the reference rater pool.

5. The method of claim 1, wherein the data representing the traffic encounter between the vehicle and the pedestrian is data recorded by a physical ADV in a real-world driving environment.

6. The method of claim 1, wherein the data representing the traffic encounter between the vehicle and the pedestrian is simulated data generated for a simulated ADV in a simulated driving environment.

7. The method of claim 6, further comprising:
receiving data representing a first traffic encounter between a physical ADV in a real-world driving environment;
applying one or more transformations to the data representing the first traffic encounter to create a modified set of simulated traffic encounters;
creating an expanded training set comprising the data representing the first traffic encounter and the modified set of simulated traffic encounters; and
training the rating transformation model using the expanded training set.

8. The method of claim 1, further comprising:
adjusting the transformed comfort scale ratings using a validity function learned for a target geographic region.

9. The method of claim 8, wherein the validity function is based on first-person log data of pedestrians in the target geographic region.

10. The method of claim 1, further comprising performing a dimensionality reduction process to transform the plurality of comfort scale ratings into a single comfort score per log.

11. The method of claim 10, further comprising:
using the comfort score in a cost function for training the driving control model to avoid driving behaviors that make other road users uncomfortable due to being surprised, a lack of civility, or unpleasantness.

12. A system comprising:
one or more computers and one or more storage devices storing instructions that are operable, when executed by the one or more computers, to cause the one or more computers to perform operations comprising:
receiving data representing a traffic encounter between a vehicle and a pedestrian;
receiving a plurality of comfort scale ratings of the traffic encounter assigned by a rater belonging to a first rater pool;
generating an input element for a rating transformation model configured to predict how comfort scale ratings assigned by a particular rater pool would have been assigned by a representative rater belonging to a reference rater pool;
performing an inference pass over the rating transformation model using the input element to obtain a plurality of transformed comfort scale ratings for the reference rater pool;
training a driving control model using the transformed comfort scale ratings; and
controlling an autonomously driven vehicle (ADV) based on the driving control model trained on the plurality of transformed comfort scale ratings for the reference rater pool.

13. The system of claim 12, wherein the rating transformation model learns to adjust for variance in the comfort scale ratings attributable to rater pool location, rater id, and log id.

14. The system of claim 12, wherein the operations further comprise:
training, using training data, the rating transformation model in a training phase in which each input element comprises a rater id; and
performing the inference pass in which the input element has a rater id that was not represented in the training data.

15. The system of claim 14, wherein during the training phase the input element comprises a pool id that identifies the first rater pool, and wherein performing the inference pass comprises changing the pool id to identify the reference rater pool.

16. The system of claim 12, wherein the data representing the traffic encounter between the vehicle and the pedestrian is data recorded by a physical ADV in a real-world driving environment.

17. The system of claim 12, wherein the data representing the traffic encounter between the vehicle and the pedestrian is simulated data generated for a simulated ADV in a simulated driving environment.

18. The system of claim 17, wherein the operations further comprise:
receiving data representing a first traffic encounter between a physical ADV in a real-world driving environment;
applying one or more transformations to the data representing the first traffic encounter to create a modified set of simulated traffic encounters;
creating an expanded training set comprising the data representing the first traffic encounter and the modified set of simulated traffic encounters; and
training the rating transformation model using the expanded training set.

19. The system of claim 12, wherein the operations further comprise:
adjusting the transformed comfort scale ratings using a validity function learned for a target geographic region.

20. One or more non-transitory computer storage media encoded with computer program instructions that when executed by one or more computers cause the one or more computers to perform operations comprising:
receiving data representing a traffic encounter between a vehicle and a pedestrian;
receiving a plurality of comfort scale ratings of the traffic encounter assigned by a rater belonging to a first rater pool;
generating an input element for a rating transformation model configured to predict how comfort scale ratings assigned by a particular rater pool would have been assigned by a representative rater belonging to a reference rater pool;

performing an inference pass over the rating transformation model using the input element to obtain a plurality of transformed comfort scale ratings for the reference rater pool;

training a driving control model using the transformed comfort scale ratings; and controlling an autonomously driven vehicle (ADV) based on the driving control model trained on the plurality of transformed comfort scale ratings for the reference rater pool.

* * * * *